(12) United States Patent
Li et al.

(10) Patent No.: US 8,718,541 B2
(45) Date of Patent: May 6, 2014

(54) TECHNIQUES FOR OPTIMAL LOCATION AND CONFIGURATION OF INFRASTRUCTURE RELAY NODES IN WIRELESS NETWORKS

(75) Inventors: Qinghua Li, Sunnyvale, CA (US); Xintian Eddie Lin, Mountain View, CA (US); Minnie Ho, Los Altos, CA (US); Alexei Davydov, Nizhny Novgorod (RU); Andrey Pudeyev, Nizhny Novgorod (RU); Alexander Maltsev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/967,332

(22) Filed: Dec. 31, 2007

(65) Prior Publication Data

US 2009/0168687 A1    Jul. 2, 2009

(51) Int. Cl.
| | | |
|---|---|---|
| H04B 7/15 | (2006.01) | |
| H04B 7/185 | (2006.01) | |
| H04L 12/28 | (2006.01) | |
| H04B 7/14 | (2006.01) | |
| H04J 1/10 | (2006.01) | |
| H04J 3/08 | (2006.01) | |
| G06F 17/50 | (2006.01) | |
| G06G 7/62 | (2006.01) | |

(52) U.S. Cl.
USPC ...... 455/11.1; 455/13.1; 455/422.1; 455/446; 370/254; 370/315; 370/338; 342/353; 703/13

(58) Field of Classification Search
CPC .................................. H04B 7/14; H04B 7/15
USPC ......... 455/3.01–3.05, 403, 414.1, 422, 575.1, 455/418–420, 550.01, 556.1–556.2, 566, 7, 455/9, 10, 11.1, 12.1, 13.1, 13.2, 13.3, 16, 455/17, 19, 20, 24, 25, 41.2, 63.4, 101, 455/277.1, 404.2, 422.1, 427, 435.2, 445, 455/456.1, 456.2, 555, 574, 1, 424, 522, 455/561; 345/473, 716, 719, 720, 722, 723, 345/853; 379/67.1, 68, 88.13, 88.16, 88.19, 379/88.22, 93.01, 231, 373.02, 238, 252, 379/254, 294, 315, 328, 329, 331, 335, 338, 379/492, 501, 4, 72, 93.09, 296, 353; 386/239, 241; 709/204–206, 224, 219, 709/231; 715/716, 719–722, 727, 751, 715/753–759; 342/15, 26 D, 353, 357.43, 342/457; 343/702, 765, 766, 880, 882; 703/13, 2; 716/114, 130, 134; 370/238, 370/252, 254, 294, 315, 328, 329, 331, 335, 370/338, 492, 501, 208, 310, 316, 400
See application file for complete search history.

(56) References Cited

U.S. PATENT DOCUMENTS

| | | | |
|---|---|---|---|
| 5,613,217 A | 3/1997 | Hagstrom et al. | |
| 6,507,741 B1 * | 1/2003 | Bassirat | 455/440 |

(Continued)

FOREIGN PATENT DOCUMENTS

| | | |
|---|---|---|
| CN | 1709002 A | 12/2005 |
| CN | 1881825 A | 12/2006 |

(Continued)

OTHER PUBLICATIONS

International Preliminary Report on Patentability received for PCT Patent Application No. PCT/US2008/085192, mailed on Jul. 15, 2010, 6 pages.

(Continued)

*Primary Examiner* — Ping Hsieh
*Assistant Examiner* — Paul P Tran
(74) *Attorney, Agent, or Firm* — Thorpe North & Western, LLP

(57) ABSTRACT

An embodiment of the present invention provides a method, comprising optimizing the location and configuration of relay stations in a wireless network that includes at least one base station and at least one relay station by taking into account at least one or more of the following: the distinct antenna heights of said at least one base station and said at least one relay station; the data dependency between said at least one relay station and said at least one base station; the service outage of said wireless network; and the network throughput of said wireless network.

21 Claims, 6 Drawing Sheets

(56) References Cited

U.S. PATENT DOCUMENTS

| | | | |
|---|---|---|---|
| 6,804,491 | B1 | 10/2004 | Uesugi |
| 7,295,960 | B2 | 11/2007 | Rappaport et al. |
| 7,773,941 | B2* | 8/2010 | Bonta et al. ............... 455/11.1 |
| 2002/0077151 | A1* | 6/2002 | Matthews et al. ............. 455/561 |
| 2003/0068975 | A1* | 4/2003 | Qiao et al. ................... 455/11.1 |
| 2003/0153316 | A1* | 8/2003 | Noll et al. ..................... 455/446 |
| 2003/0216121 | A1* | 11/2003 | Yarkosky ..................... 455/12.1 |
| 2004/0152362 | A1 | 8/2004 | Carter et al. |
| 2005/0059342 | A1 | 3/2005 | Engels et al. |
| 2005/0285784 | A1* | 12/2005 | Chiang et al. ................. 342/359 |
| 2006/0084379 | A1* | 4/2006 | O'Neill ............................ 455/25 |
| 2006/0128372 | A1* | 6/2006 | Gazzola ........................ 455/424 |
| 2006/0205341 | A1 | 9/2006 | Runyon |
| 2006/0209671 | A1* | 9/2006 | Khan et al. ................... 370/208 |
| 2006/0252367 | A1* | 11/2006 | Haartsen ..................... 455/11.1 |
| 2006/0281493 | A1 | 12/2006 | Basgeet et al. |
| 2007/0183439 | A1* | 8/2007 | Osann, Jr. ..................... 370/406 |
| 2007/0291663 | A1 | 12/2007 | Dixit et al. |
| 2008/0062909 | A1* | 3/2008 | Shin et al. ..................... 370/315 |
| 2008/0240018 | A1* | 10/2008 | Xue et al. ..................... 370/328 |
| 2008/0260000 | A1* | 10/2008 | Periyalwar et al. ............ 375/133 |
| 2009/0088070 | A1* | 4/2009 | Aaron ................................ 455/7 |
| 2010/0015914 | A1* | 1/2010 | Li et al. ............................. 455/7 |
| 2010/0075683 | A1* | 3/2010 | Johansson et al. ............ 455/446 |
| 2010/0098038 | A1 | 4/2010 | Chang et al. |
| 2010/0317285 | A1 | 12/2010 | Jang |

FOREIGN PATENT DOCUMENTS

| | | | |
|---|---|---|---|
| CN | 1929687 | A | 3/2007 |
| CN | 1996786 | A | 7/2007 |
| CN | 101911824 | A | 12/2010 |
| DE | 112008003521 | T5 | 10/2010 |
| EP | 644551 | A2 | 3/1995 |
| EP | 1083681 | A1 | 3/2001 |
| GB | 2468463 | A | 9/2010 |
| JP | 2000082291 | A | 3/2000 |
| JP | 2000286787 | A | 10/2000 |
| JP | 2001269891 | A | 10/2001 |
| JP | 2002118873 | A | 4/2002 |
| KR | 10-2007-0019598 | A | 2/2007 |
| KR | 20080079446 | A | 9/2008 |
| WO | 2005/117470 | A2 | 12/2005 |
| WO | 2006034578 | A1 | 4/2006 |
| WO | 2006/115288 | A1 | 11/2006 |
| WO | 2007004931 | A1 | 1/2007 |
| WO | 2009/088583 | A2 | 7/2009 |
| WO | 2009088583 | A2 | 7/2009 |
| WO | 2009/088583 | A3 | 9/2009 |

OTHER PUBLICATIONS

International Search Report/ Written Opinion received for PCT Patent Application No. PCT/US2008/085192, Mailed on Jun. 26, 2009, pp. 11.

Fang-Ching, R,. et al., "Recommendation on PMP Mode Compatible TDD Frame Structure", IEEE 802, 16mmr-05/027r1, Found on Nov. 17, 2011, URL: http://ieee802.org/16/sg/mmr/contrib/C80216mmr-05_027r1.pdf,(Nov. 15, 2005).

"Techniques for Optimal Location and Configuration of Infrastructure Relay Nodes in Wireless Networks", International Preliminary Report on Patentability received for PCT Application No. PCT/US2008/085192, on Jul. 15, 2010, 6 pages.

International Search Report and Written Opinion received for PCT Application No. PCT/US2008/085192, on Jun. 26, 2009, 11 pages.

Techniques for Optimal Location and Configuration of Infrastructure Relay Nodes in Wireless Networks, JP Office Action received for Application No. 2010-540717, Nov. 29, 2011, 7 pages (4 pages English Translation).

GB Office Action received for Application No. GB1011749.7, Jan. 24, 2012, 3 pages.

Badruddin, N., "Capacity improvement in a COMA system using relaying" Dept of Electr. & Electron. Eng., Unlversiti Teknologi Petrcnes, Perak, Malaysia, vol. 1, Mar. 21-25, 2004, pp. 243-248.

Office Action received for Japanese Patent Application No. 2010-540717, mailed on May 22, 2012, 9 pages of Office Action including 5 pages Of English Translation.

Office Action received for Chinese Patent Application no. 200880123632.X, mailed on Aug. 31, 2012, 11 pages of Office Action including 5 pages of English Translation.

Notice of Allowance received for United Kingdom Patent Application No. 1011749.7, mailed on Apr. 10, 2012, 2 pages.

Office Action received for Chinese Patent Application No. 200880123632.X, mailed on Apr. 27, 2013, 12 pages of Office Action including 7 pages of English Translation.

Office Action received for Germany Patent Application No. 112008003521.0, mailed on Sep. 20, 2013, 10 pages of Office Action including 4 pages of English translation.

Office Action received for Chinese Patent Application No. 200880123632.X, mailed on Nov. 15, 2013, 10 pages of Office Action including 6 pages of English translation.

* cited by examiner

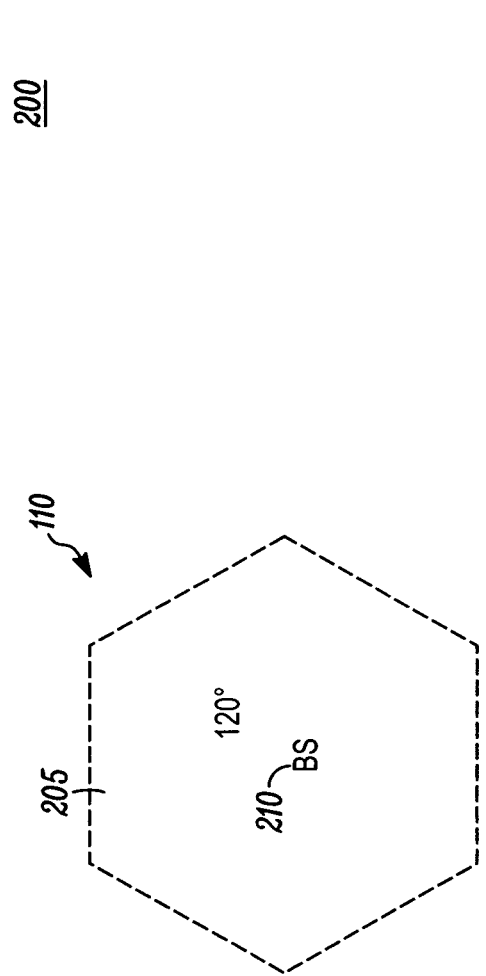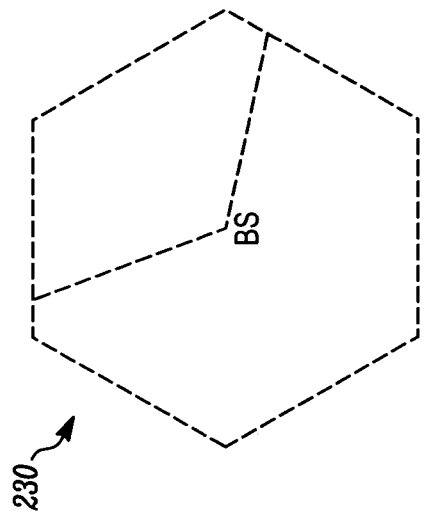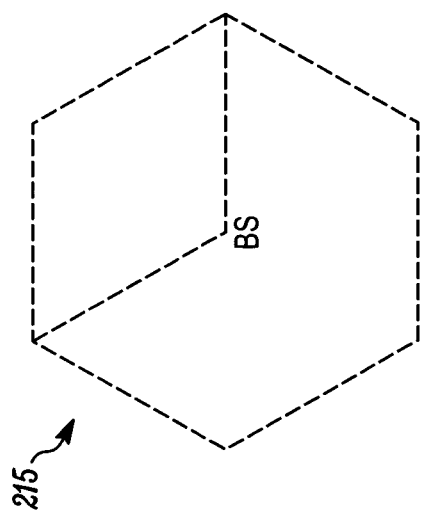

TECHNIQUES FOR OPTIMAL LOCATION AND CONFIGURATION OF INFRASTRUCTURE RELAY NODES IN WIRELESS NETWORKS

BACKGROUND

Complete coverage in wireless networks can be difficult but is vital to wireless communications in the wireless networks. One such wireless network, although the present invention is not limited in this respect, is WiMAX. WiMAX is defined as Worldwide Interoperability for Microwave Access by the WiMAX Forum, formed in June 2001 to promote conformance and interoperability of the IEEE 802.16 standard, officially known as WirelessMAN. WiMAX may provide a range of up to 80 km and provide high bandwidth. However, given the large area of service, complete coverage can be problematic.

Thus, a long felt need exists for an invention that remedies the aforementioned shortcomings of existing wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 shows different sector shapes of embodiments of the present invention;

Figure 1:
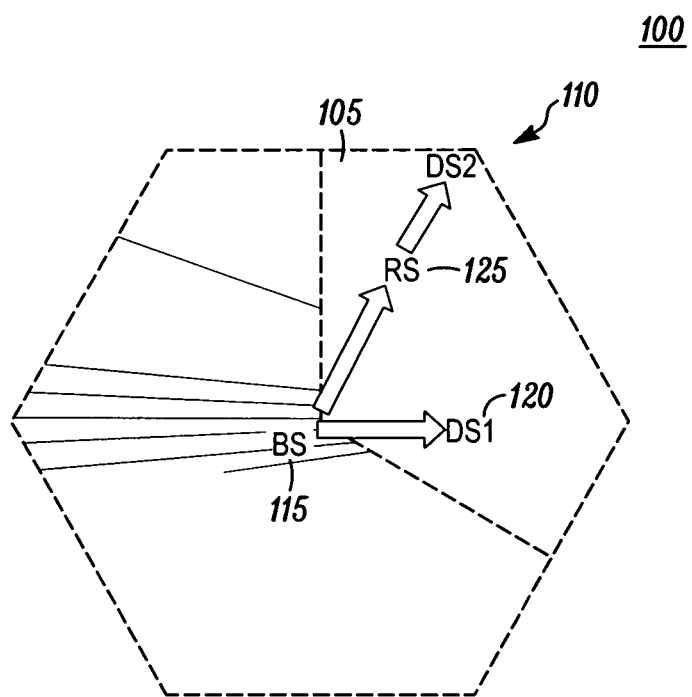
FIG. 1 illustrates a sector, base station, relay station, and destination stations of embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

An embodiment of the present invention provides optimized relay node (also referred to herein as relay station or infrastructure relay station) locations and configurations, which takes into account the antenna radiation patterns, service outage, inter-cell interference, and data dependency between the base station and relay station. It is understood that the present invention is not limited to these criteria. On one hand, it is desirable to place the relay node close to the edge of the cell in order to reduce outage and inter-cell interference. On the other hand the data in the relay node are obtained from the base station over the normal downlink (or uplink) band. The base station has to fill the relay node before both of them can transmit to their destination nodes simultaneously. It may be desirable to place the relay node close to the base station because it reduces the filling time of the relay node and enables high-throughput simultaneous transmissions. Embodiments of the present invention provide deployment rules and optimized configurations as set forth below.

Although the present invention is not limited in this respect, as shown generally as 100 of FIG. 1, in each sector 105 of WiMAX 2, such as but not limited to 802.16m, there may be at least one base station (BS) 115 and there may be one or multiple infrastructure relay stations (RSs) 125. The base station sends data to its direct destination station (DS) 120 and to the relay station (RS) 125 over the same frequency band. The relay station 125 forwards the received data to a destination station 110 or another relay station. The relay station 125 improves both reliability and throughput. The parallel transmissions from the base station and relay station to their destination stations increase the throughput by more than 20%.

The antenna radiation patterns of the base station 115 and relay station 125 may be different. The base station 115 antenna has high directivity in both elevation and azimuth due to greater size, while the relay antenna has lower directivity. The peak antenna gain of the base station 115 is usually 16 dBi, which is much higher than that of the relay station 125. The mounting height of the base station is also much higher than that of the relay station, e.g. 30 m vs. 10 m.

Embodiments of the present invention provides optimizing the deployment location and antenna pattern of the relay station 125 by taking into account 1) the distinct antenna heights; 2) the data dependency between the relay station and base station; 3) the service outage; and 4) network throughput. Some design criteria are listed below—although it is understood that this list is not exhaustive and the present invention is not limited to this enumeration of criteria.

1. The low antenna mounting of the relay station 125 makes its signal attenuate faster than that of the base station 115. This is useful to reduce inter-cell interference. Therefore, it is desirable to deploy the relay station 125 close to the edge of the sector.

2. Since all the downlink data sent by the relay station 125 are obtained from the base station 115, the downlink throughput sent by the relay station 125 must be not greater than the throughput of the link from the base station 115 to the relay station 125. It is desirable to place the relay station 125 close to the base station 115, or increase the relay antenna gain at the direction to the base station 115, or increase the base station 115 antenna gain in the direction to the relay station 125.

3. It is shown that parallel transmissions from the base station 115 and the relay station 125 increase the throughput. According to criterion above, the link throughput between the base station 115 and the relay station 125 should be at least N times of that from the relay station 125 to destination station 110 to enable the N+1-station transmission, where N is the number of relay stations. The relay station 125 should get close to the base station 115 as the number of relay stations increases. The link throughput depends on the techniques of the transceivers.

4. The service outage often occurs at the cell 105 edge. It is desirable to put relay station 125 close to the cell edge for outage reduction. In general, the relay station 125 should be deployed at the place, where the base station 115 signal is relatively low. Namely, the coverage areas of the base station 115 and the relay station 125 should be complementary.

5. The separation between multiple relay stations should be maximized so that the interference between them is minimized.

6. Since criteria 2 and 3 contradict criterion 4, the present invention maximizes the throughput using criteria 2 and 3 subject to the outage rate below a predetermined threshold.

The exact location of relay station 125 depends on the factors in the real deployment environment such as the street layout, surrounding buildings, foliage, and terrain. Therefore, the following figures are for illustration of the averaged center location not the exact location, which deviates from the center by a random amount and it is understood the present invention is not limited to the figures provided below.

In order to improve the throughput and outage performance, the shape of the sector can be changed as shown in generally as 200 of FIG. 2. The 120 degree angle 205 in the upper portion 210 can be rotated as shown at 215, 220 and 230. The sector is the intersection between the angle and the hexagon. The sector shape can be optimized according to the number of relay stations and their antenna radiation patterns. The 120 degree angle can be replaced by 60 degree angle if six sectors per cell is employed.

According to criteria 2 and 3, we know as shown in FIG. 3 at 300 that the antenna radiation pattern of the relay station is not omni-directional. The area covered by relay station is shown at 312 and 325 and area covered by base station at 304 and 315. There should be a peak pointing to the direction of the base station's incoming signal. Further, there may be a "front lobe" 314 and 310 to serve the users between the relay station and the BS. Depending on the distance d between the relay station and coverage boundary, it needs a "back lobe" 316 and 330 to serve the users behind the relay station. In other words, some users are served in the relay forward mode, where signals are forwarded further by the relay station. Other users may be served by the 'bounce' mode, where signals are bounced back by the relay station. The relative advantage of 'bounce' mode is that the co-channel interference generated by the relay station is weaker since it has to propagate longer distance to the neighboring cells/sectors. Cell planning can also have a mixed value of "d" for the purpose of increasing CINR considering the other factors, like local environment.

Figure 3A:
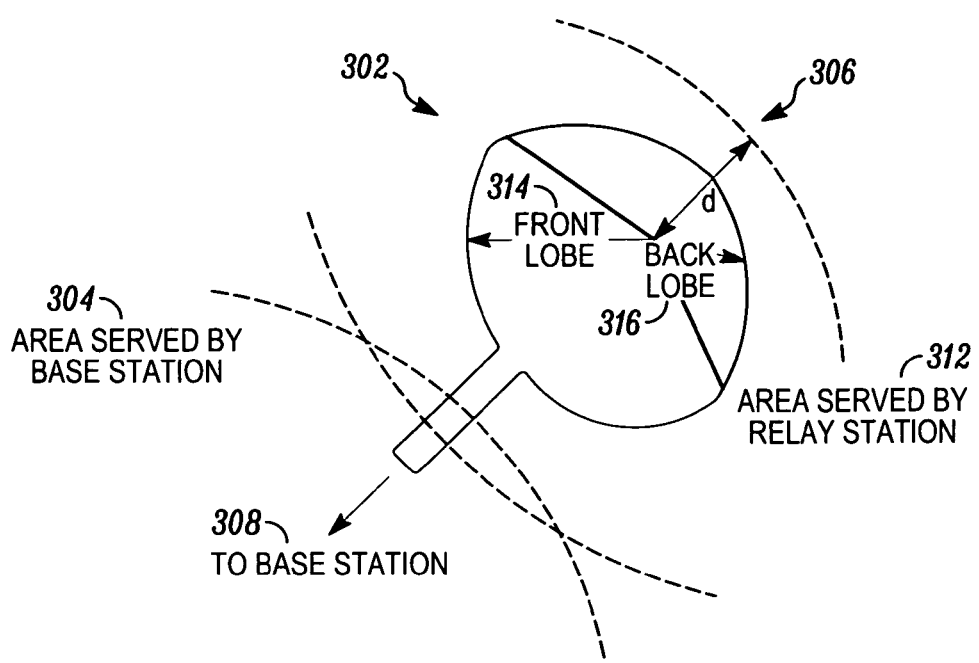
FIG. 3a shows an ideal single antenna pattern for relay stations according to an embodiment of the present invention.
Figure 3B:
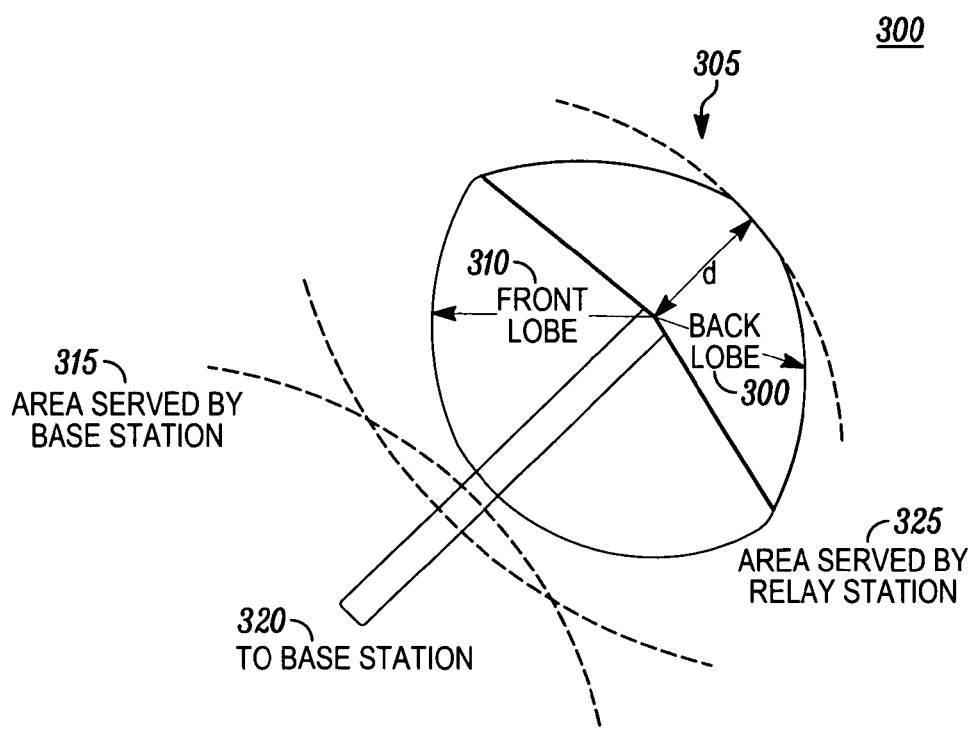
FIG. 3b shows an ideal multiple antenna pattern for relay stations according to an embodiment of the present invention the other is multiple antennas.

FIG. 3a at 302 shows an ideal single antenna pattern for relay stations and FIG. 3b at 300 shows an ideal multiple antenna pattern for relay stations according to embodiments of the present invention. FIGS. 3a and 3b show an RS antenna patterns, which have 3 components: 1) A high gain directional antenna towards BS 308 and 320 and a median gain towards the user in the front 314 and 310 and a back lobe 316 and 330 for user behind the RS. The front and back ratio depends on the RS location.

2) The pattern does not have to be constant. For example, when the RS is receiving/transmitting data with the BS, the desired pattern is a single high gain beam. While communicating with the MSs, the designed pattern has a front 314, 310 and back lobe 316 and 330 coverage. In other words, the RS antenna pattern can be time varying. For example, switching between 2 or more antennas. It is noted, the 2-antenna approach performs better (~3 dB) than a single antenna.

In addition, there is no need for a relay station to send signals to the area already covered by the base station. Therefore, there should be nulls pointing to those areas to reduce interference and boost antenna gain.

In practice, two or multiple antennas may be used by the relay station to achieve the ideal performance. For example, the relay may use one narrow-beam directional antenna to receive data from the base station and switch to another wide-beam directional antenna to forward the data out. Omni dipole antennas are usually used by the relay station due to cost and size, though it is not the optimal. The present invention may use omni antennas in the subsequent examples, where the omni antenna can all be replaced by the optimal.

Continuing with the Figures, various cases are set forth below.

Figure 4B:
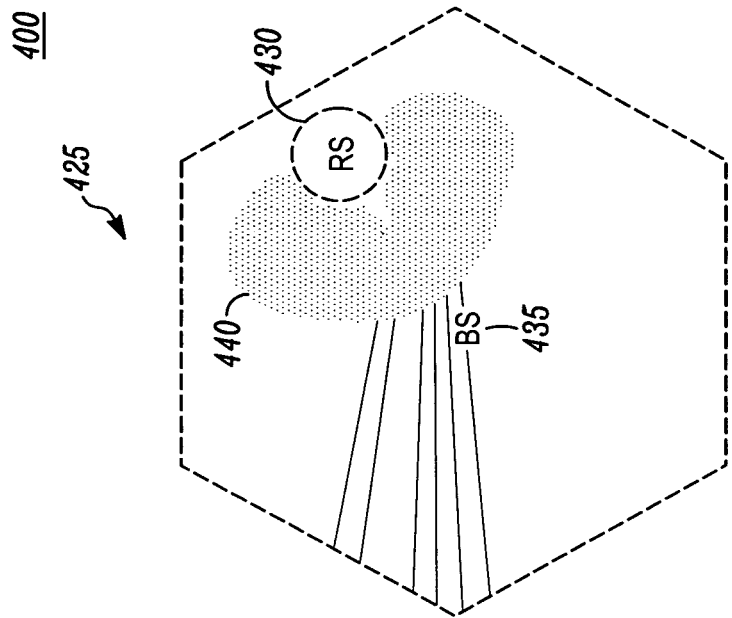
FIG. 4 illustrates deployment with one relay station according to an embodiment of the present invention.
Figure 4A:
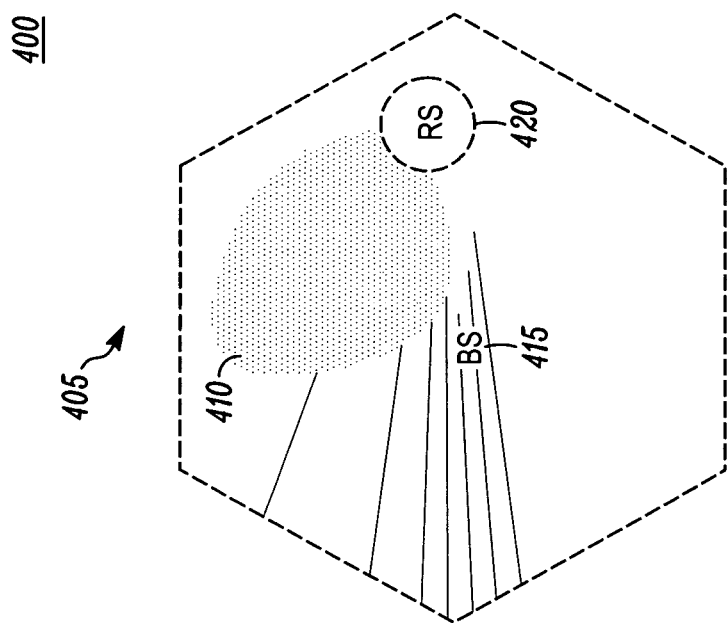

Case 1 shown at 400 in FIG. 4 provides one relay station provides two deployment configurations (a) 405 and (b) 425, i.e. asymmetric 410 and symmetric 425 configurations. The omni-directional antenna can be replaced by the optimal one in FIG. 3

The sector shape is asymmetric in FIG. 4(*a*) 405 similar that in FIG. 2(*c*) 230. The deployment configuration is also asymmetric with the relay station 420 covers the far corner on the right and the base station 415 covers the remaining, square area by a wide-beam. This configuration is desirable when the adjacent sector in the same cell employs the same frequency as in 1×3×1 deployment. It reduces the co-channel interference between co-cell sectors. The sector shape is symmetric in FIG. 4(*b*) 425. The base station 435 uses two beams 440 with a null in between. The relay station 430 covers the middle null. Only the distance between the base station 435 and the relay 430 needs to be optimized for this symmetric configuration.

Figure 5B:
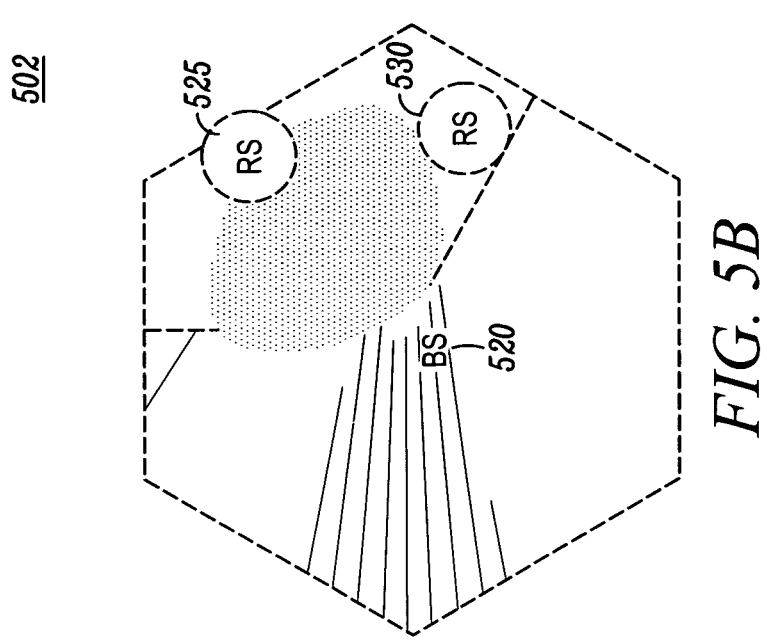
FIG. 5b illustrates deployment with two asymmetric relay stations according to an embodiment of the present invention.
Figure 5A:
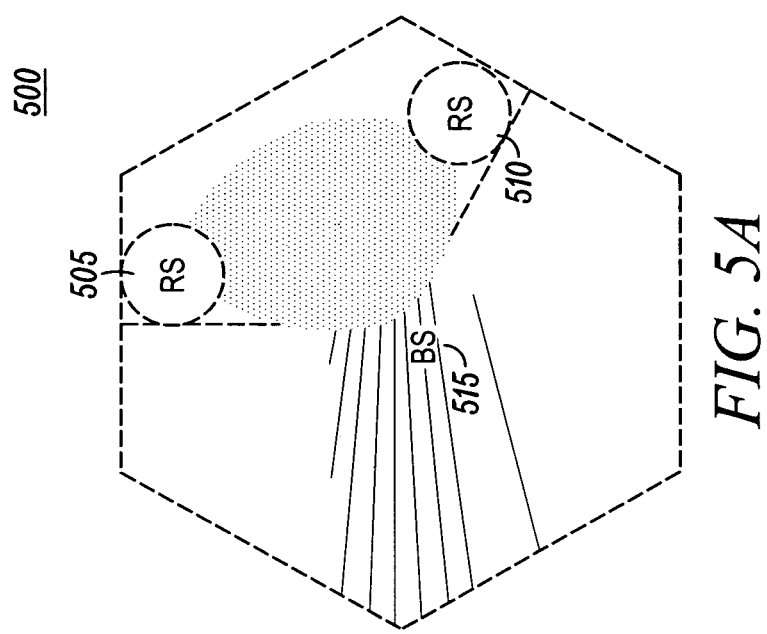
FIG. 5a illustrates deployment with two symmetric relay stations according to an embodiment of the present invention.

A further embodiment of the present invention is provided as Case 2—two relay stations shown generally in FIGS. 5*a* and 5*b*. FIG. 5*a* illustrates deployment with two symmetric relay stations according to an embodiment of the present invention and FIG. 5b illustrates deployment with two asymmetric relay stations according to an embodiment of the present invention. The relay stations in FIG. 5a 505 and 51a are located symmetrically relative to base station 515 and are separated far enough apart to reduce mutual interference for criterion 5. Base station 515 covers the remaining area by a wide-beam. Placing the relay stations close to the sector edge also reduces the inter-sector and inter-cell interference for criterion 1.

The relay stations in FIG. 5b 525 and 530 are located asymmetrically relative to base station 520 and are separated far enough apart to reduce mutual interference for criterion 5. Base station 520 covers the remaining area by a wide-beam. Placing the relay stations close to the sector edge also reduces the inter-sector and inter-cell interference for criterion 1.

Figure 6:
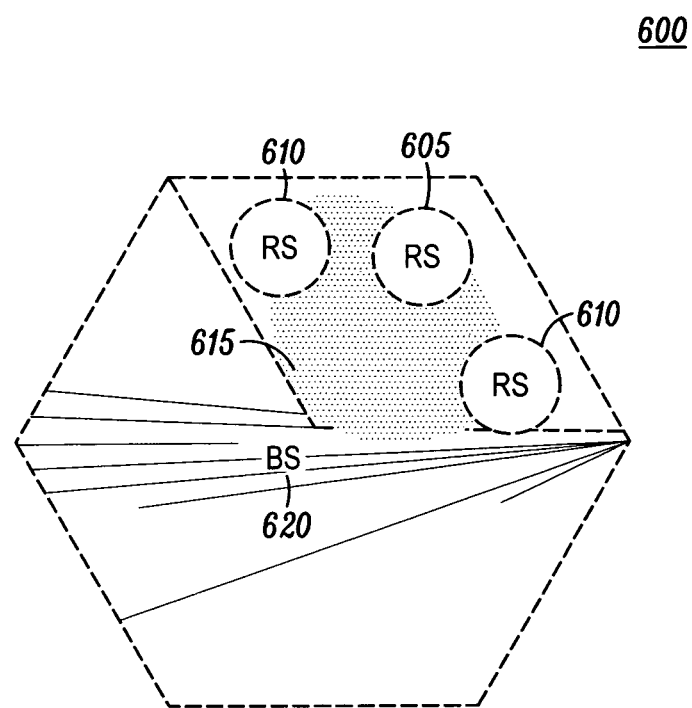
FIG. 6 illustrates deployment with three relay stations according to an embodiment of the present invention.

A further embodiment of the present invention and not limited in this respect is provided in Case 3—three relay stations shown generally as 600 of FIG. 6.

This embodiment may use one symmetric deployment configuration. The sector shape is similar to that in FIG. 2(a). The relay stations 610, 605 and 610 are located on the three far corners respectively and they separate far apart to reduce mutual interference for criterion 5. The distance between the relay station and base station is optimized for throughput subject to a predetermined outage rate. Base station 620 covers the remaining area by a wide-beam.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for optimizing the location and configuration of a relay station in a wireless network, comprising:
    optimizing a relay station location within a cell at a distinct antenna height by balancing an antenna radiation pattern and a service outage area of at least one base station in the cell against a data link throughput between the relay station and the at least one base station,
    wherein the relay station receives data from the at least one base station with a narrow-beam directional antenna and forwards the data to some of destination stations with a wide-beam directional antenna,
    wherein the data link throughput provides that data is transmitted from the at least one base station to each relay station in the cell within a desired filling time prior to a parallel transmission of a same data by the relay station and the at least one base station to a destination station, and
    wherein the relay station is placed closer to the at least one base station to reduce the filling time and to enable the high-throughput data parallel transmission as the number of relay stations increases.

2. The method of claim 1, wherein the relay station is placed close to an edge of a sector of the cell.

3. The method of claim 1, wherein the relay station is placed close to the at least one base station, or increases relay antenna gain at a direction of the at least one base station, or the at least one base station increases antenna gain in a direction of the relay station.

4. The method of claim 1, wherein the data link throughput between the at least one base station and the relay station is at least two times that of the relay station's relayed downlink throughput to allow transmission from a plurality of relay stations associated with the at least one base station.

5. The method of claim 1, wherein the relay station is placed close to a cell edge of the cell for outage reduction and further the relay station is deployed at a place where a base station signal is relatively low.

6. The method of claim 1, wherein the separation between multiple relay stations is maximized so that the interference between the multiple relay stations is minimized.

7. The method of claim 1, wherein the narrow-beam directional receive antenna of the relay station points towards the at least one base station and the wide-beam directional transmit antenna of the relay station is directed to a null user coverage area including a null within a sector or a sector edge user coverage area on a sector edge, wherein a plurality of sectors are within a cell and the null user coverage area is an area within the sector where a direct communication transmission between the destination station and the at least one base station is attenuated due to signal cancellation.

8. The method of claim 1, wherein the data link throughput decreases with a combination of a greater separation of the relay station from the at least one base station and an base station antenna oriented away from the relay station, and the service outage area increases with a combination of a greater separation of the relay station from the at least one base station and an base station antenna oriented away from the relay station.

9. A wireless network system, comprising:
    at least one base station; and
    at least one infrastructure relay station, wherein the at least one infrastructure relay station's location and configuration is optimized by locating a relay station within a cell at a selected location and at distinct antenna height by balancing an antenna radiation pattern and a service outage area of at least one base station in the cell against a data link throughput between the at least one infrastructure relay station and the at least one base station,
    wherein said at least one infrastructure relay station receives data from the at least one base station with a narrow-beam directional antenna and forwards the data to some of destination stations with a wide-beam directional antenna,
    wherein the data link throughput provides that data is transmitted from the at least one base station to each infrastructure relay station in the cell within a desired filling time prior to a parallel transmission of a same data by the at least one relay station and the at least one base station to a destination station, and
    wherein the at least one infrastructure relay station is placed closer to the at least one base station as to reduce the filling time and to enable the high-throughput data parallel transmission the number of relay stations increases.

10. The system of claim 9, wherein the at least one infrastructure relay station is placed close to an edge of a sector of the wireless network.

11. The system of claim 9, wherein the at least one infrastructure relay station is placed close to the at least one base station, or increases relay antenna gain at a direction of the at least one base station, or the at least one base station increases antenna gain in a direction of the at least one infrastructure relay station.

12. The system of claim 9, wherein the data link throughput between the at least one base station and the at least one infrastructure relay station is at least two times that of the at least one infrastructure relay station's relayed downlink throughput to allow transmission from a plurality of infrastructure relay stations associated with the at least one base station.

13. The system of claim 9, wherein the last least one infrastructure relay station is placed close to a cell edge of the wireless network for outage reduction and further the at least one infrastructure relay station is deployed at a place, where a base station signal is relatively low.

14. The system of claim 9, wherein the separation between multiple relay stations is maximized so that the interference between the multiple relay stations is minimized.

15. The system of claim 9, wherein the narrow-beam directional receive antenna of the at least one infrastructure relay station points towards the at least one base station and the wide-beam directional transmit antenna of the at least one infrastructure relay station is directed to a null user coverage area including a null within a sector or a sector edge user coverage area on a sector edge, wherein a plurality of sectors are within a cell and the null user coverage area is an area within the sector where a direct communication transmission between the destination station and the at least one base station is attenuated due to signal cancellation.

16. The system of claim 9, wherein the data link throughput decreases with a combination of a greater separation of the at least one infrastructure relay station from the at least one base station and an base station antenna oriented away from the at least one infrastructure relay station, and the service outage area increases with a combination of a greater separation of the at least one infrastructure relay station from the at least one base station and an base station antenna oriented away from the at least one infrastructure relay station.

17. A method of optimizing the location and configuration of relay stations in a wireless network, comprising:
  optimizing at least one base station antenna at a distinct base station antenna height or optimizing at least one relay station within a cell at a selected location or at a distinct relay station antenna height by balancing an antenna radiation pattern and a service outage area of the at least one base station in the cell against a data link throughput between the at least one relay station and the at least one base station,
  wherein the relay station receives data from the at least one base station with a narrow-beam directional antenna and forwards the data to some of destination stations with a wide-beam directional antenna,
  wherein the data link throughput provides that data is transmitted from the at least one base station to each relay station in the cell within a desired filling time prior to a parallel transmission of a same data by the at least one relay station and the at least one base station to a destination station, wherein the relay station is placed closer to the at least one base station to reduce the filling time and to enable the high-throughput data parallel transmission as the number of relay stations increases.

18. The method of claim 17, wherein the at least one relay station is placed close to an edge of a sector of the cell.

19. The method of claim 17, wherein the relay station is placed close to the at least one base station, or increases relay antenna gain at a direction of the at least one base station, or the at least one base station increases antenna gain in a direction of the relay station.

20. The method of claim 17, wherein the data link throughput between the at least one base station and the relay station is at least two times that of the at least one infrastructure relay station's relayed downlink throughput to allow transmission from a plurality of relay stations associated with the at least one base station.

21. The method of claim 17, wherein the relay station is placed close to a cell edge of the cell for outage reduction and further the relay station is deployed at a place where a base station signal is relatively low.

\* \* \* \* \*